US011777409B2

(12) United States Patent
Xu

(10) Patent No.: US 11,777,409 B2
(45) Date of Patent: Oct. 3, 2023

(54) INDUCTIVE CURRENT SIMULATION CIRCUIT OF SWITCHING CIRCUIT, INDUCTIVE CURRENT SIMULATION METHOD OF SWITCHING CIRCUIT, AND SWITCHED-MODE POWER SUPPLY

(71) Applicant: Joulwatt Technology Co., Ltd., Hangzhou (CN)

(72) Inventor: Aimin Xu, Hangzhou (CN)

(73) Assignee: JOULWATT TECHNOLOGY CO., LTD., Hangzhou (CN)

( * ) Notice: Subject to any disclaimer, the term of this patent is extended or adjusted under 35 U.S.C. 154(b) by 79 days.

(21) Appl. No.: 17/544,609

(22) Filed: Dec. 7, 2021

(65) Prior Publication Data

US 2022/0181977 A1 Jun. 9, 2022

(30) Foreign Application Priority Data

Dec. 9, 2020 (CN) .......................... 202011446207.3

(51) Int. Cl.
*H02M 3/158* (2006.01)
*H02M 1/00* (2006.01)

(52) U.S. Cl.
CPC ....... *H02M 3/1588* (2013.01); *H02M 1/0009* (2021.05)

(58) Field of Classification Search
CPC .................. H02M 1/0009; H02M 3/155–1588
See application file for complete search history.

(56) References Cited

U.S. PATENT DOCUMENTS

| 7,135,841 | B1 * | 11/2006 | Tomiyoshi | H02M 3/156 323/224 |
| 10,063,146 | B1 * | 8/2018 | Lee | G01R 19/003 |
| 2012/0119718 | A1 * | 5/2012 | Song | G05F 1/10 323/282 |
| 2015/0222171 | A1 * | 8/2015 | Nguyen | H02M 1/08 323/282 |
| 2017/0338739 | A1 * | 11/2017 | Nguyen | H02M 3/1588 |
| 2017/0346385 | A1 * | 11/2017 | Liang | H02M 3/156 |
| 2018/0337599 | A1 * | 11/2018 | Chen | H02M 3/158 |
| 2021/0099080 | A1 * | 4/2021 | Chen | H02M 3/155 |
| 2021/0336544 | A1 * | 10/2021 | Wang | H02M 1/08 |
| 2021/0351687 | A1 * | 11/2021 | Fang | H02M 3/156 |
| 2022/0311338 | A1 * | 9/2022 | Fang | H02M 3/158 |

* cited by examiner

*Primary Examiner* — Fred E Finch, III
(74) *Attorney, Agent, or Firm* — Bayramoglu Law Offices LLC

(57) ABSTRACT

An inductive current simulation circuit of a switching circuit, an inductive current simulation method of the switching circuit, and a switched-mode power supply are provided. The inductive current simulation method includes the following steps: based on an error amplification circuit, performing, by the error amplification circuit, an error amplification on a first sampling signal representing a current of a synchronous rectifier and a second sampling signal representing an inductive current simulation signal when the synchronous rectifier is turned on to obtain an error amplification signal; and reconstructing an inductive current according to the error amplification signal when the synchronous rectifier is turned on and a first current when a main power transistor is turned on to obtain the inductive current simulation signal.

8 Claims, 3 Drawing Sheets

INDUCTIVE CURRENT SIMULATION CIRCUIT OF SWITCHING CIRCUIT, INDUCTIVE CURRENT SIMULATION METHOD OF SWITCHING CIRCUIT, AND SWITCHED-MODE POWER SUPPLY

CROSS REFERENCE TO THE RELATED APPLICATIONS

This application is based upon and claims priority to Chinese Patent Application No. 202011446207.3, filed on Dec. 9, 2020, the entire contents of which are incorporated herein by reference.

TECHNICAL FIELD

The present disclosure relates to the field of power electronics, and particularly to an inductive current simulation circuit of a switching circuit, an inductive current simulation method of the switching circuit, and a switched-mode power supply.

BACKGROUND

Inductive current sampling signals are typically utilized in the control strategy of the switching circuit. In some application scenarios, the conduction time of the main power transistor of the switching circuit is very short, so that the inductive charging and discharging current cannot be accurately sampled, and thereby affecting the control effect of the switching circuit.

SUMMARY

An objective of the present disclosure is to provide an inductive current simulation circuit which can reconstruct an inductive current of a switching circuit, so as to solve the problem of inaccurate inductive current sampling.

In order to achieve the above objective, the present disclosure provides an inductive current simulation circuit of a switching circuit. The switching circuit includes a main power transistor and a synchronous rectifier. The inductive current simulation circuit includes an error amplification circuit and an output current generating circuit.

The error amplification circuit receives a first sampling signal representing a current of the synchronous rectifier and a second sampling signal representing an inductive current simulation signal in a conduction stage of the synchronous rectifier, and outputs an error amplification signal.

The output current generating circuit is configured to generate the inductive current simulation signal. In the conduction stage of the synchronous rectifier, the error amplification signal drives the output current generating circuit. In a conduction stage of the main power transistor, the output current generating circuit is driven by a first current.

Optionally, the inductive current simulation circuit may further include a first current generating circuit, generating the first current according to the inductive current simulation signal, a topological structure of the switching circuit, an input voltage and an output voltage.

Optionally, the inductive current simulation circuit may further include a first current generating circuit, generating the first current according to a direction of an output current of the error amplification circuit within a first time when the synchronous rectifier is turned on.

Optionally, the first current generating circuit may include a first capacitor and a first switching transistor. A charging current of the first capacitor may be set according to the inductive current simulation signal, and a discharging current of the first capacitor may be set according to the charging current, the topological structure of the switching circuit, the input voltage and the output voltage. The first capacitor may be charged with the charging current throughout a work cycle, and the first capacitor may be discharged with the discharging current during a conduction period of the main power transistor. A voltage of the first capacitor may drive the first switching transistor, and a current of the first switching transistor may be the first current.

Optionally, the first current generating circuit may include a first capacitor and a first switching transistor. The first capacitor may be charged with a second current or discharged with the second current according to the direction of the output current of the error amplification circuit within the first time when the synchronous rectifier is turned on. A voltage of the first capacitor may drive the first switching transistor, and a current of the first switching transistor may be the first current.

Optionally, the output current generating circuit may include an output transistor and a sampling transistor. One terminal of the output transistor may be connected with one terminal of the sampling transistor, and the other terminal of the sampling transistor may be connected with a common connecting terminal of the main power transistor and the synchronous rectifier. In the conduction stage of the synchronous rectifier, the error amplification signal may drive the output transistor. In the conduction stage of the main power transistor, the first current may drive the output transistor, and a current of the output transistor may represent the inductive current simulation signal.

Optionally, the other terminal of the output transistor may be connected with a resistor.

Optionally, a first input terminal of the error amplification circuit may be connected with a grounding terminal of the synchronous rectifier, and a second terminal of the error amplification circuit may be connected with a common connecting terminal of a sampling transistor and an output transistor. In the conduction stage of the synchronous rectifier, the error amplification circuit may be enabled to output the error amplification signal.

Optionally, when the switching circuit is a buck circuit, the charging current of the first capacitor may represent the inductive current simulation signal, and the discharging current of the first capacitor may be proportional to a product of the charging current and the input voltage and inversely proportional to the output voltage.

The present disclosure further provides an inductive current simulation method of a switching circuit. The switching circuit includes a main power transistor and a synchronous rectifier. The inductive current simulation method comprises the following steps: based on an error amplification circuit, performing, by the error amplification circuit, an error amplification on a first sampling signal representing a current of the synchronous rectifier and a second sampling signal representing an inductive current simulation signal when the synchronous rectifier is turned on to obtain an error amplification signal; and reconstructing an inductive current according to the error amplification signal when the synchronous rectifier is turned on and a first current when the main power transistor is turned on to obtain the inductive current simulation signal.

Optionally, the first current may be generated according to the inductive current simulation signal, a topological structure of the switching circuit, an input voltage and an output voltage.

Optionally, the first current may be generated according to a direction of an output current of the error amplification circuit within a first time when the synchronous rectifier is turned on.

Optionally, a charging current of a first capacitor may be set according to the inductive current simulation signal, and a discharging current of the first capacitor may be set according to the charging current, the topological structure of the switching circuit, the input voltage and the output voltage. The first capacitor may be charged with the charging current throughout a work cycle, and the first capacitor may be discharged with the discharging current during a conduction period of the main power transistor. A voltage of the first capacitor may drive a first switching transistor, and a current of the first switching transistor may be the first current.

Optionally, a first capacitor may be charged with a second current or discharged with the second current according to the direction of the output current of the error amplification circuit within the first time when the synchronous rectifier is turned on. A voltage of the first capacitor may drive a first switching transistor, and a current of the first switching transistor may be the first current.

Optionally, when the switching circuit is a buck circuit, the charging current of the first capacitor may represent the inductive current simulation signal, and the discharging current of the first capacitor may be proportional to a product of the charging current and the input voltage and inversely proportional to the output voltage.

The present disclosure further provides a switched-mode power supply, including any one of the above inductive current simulation circuits to simulate an inductive current of a switching circuit.

Compared with the prior art, the present disclosure has the following advantages: based on an error amplification circuit, when the synchronous rectifier is turned on, an error amplification is performed, on a first sampling signal representing a current of a synchronous rectifier and a second sampling signal representing an inductive current simulation signal by the error amplification circuit, to obtain an error amplification signal. An inductive current is reconstructed according to the error amplification signal when the synchronous rectifier is turned on and a first current when a main power transistor is turned on to obtain the inductive current simulation signal. According to the present disclosure, the inductive current may be reconstructed to obtain the inductive current simulation signal, and the problem of inaccurate sampling precision caused by inductive current sampling is thusly avoided.

DETAILED DESCRIPTION OF THE EMBODIMENTS

The preferred embodiments of the present disclosure are described in detail below with reference to the drawings, but the present disclosure is not limited to these embodiments. The present disclosure covers any substitution, modification, equivalent method and solution made within the spirit and scope of the present disclosure.

For a better understanding of the present disclosure, the specific details of the following preferred embodiments of the present disclosure are explained herein after in detail, while the present disclosure can also be fully understood by those skilled in the art without the description of these details.

The present disclosure is described in detail by giving examples with reference to the drawings. It should be noted that the drawings are simplified and do not use an accurate proportion, that is, the drawings are for the objectives of conveniently and clearly assisting in illustrating embodiments of the present disclosure.

Figure 1:
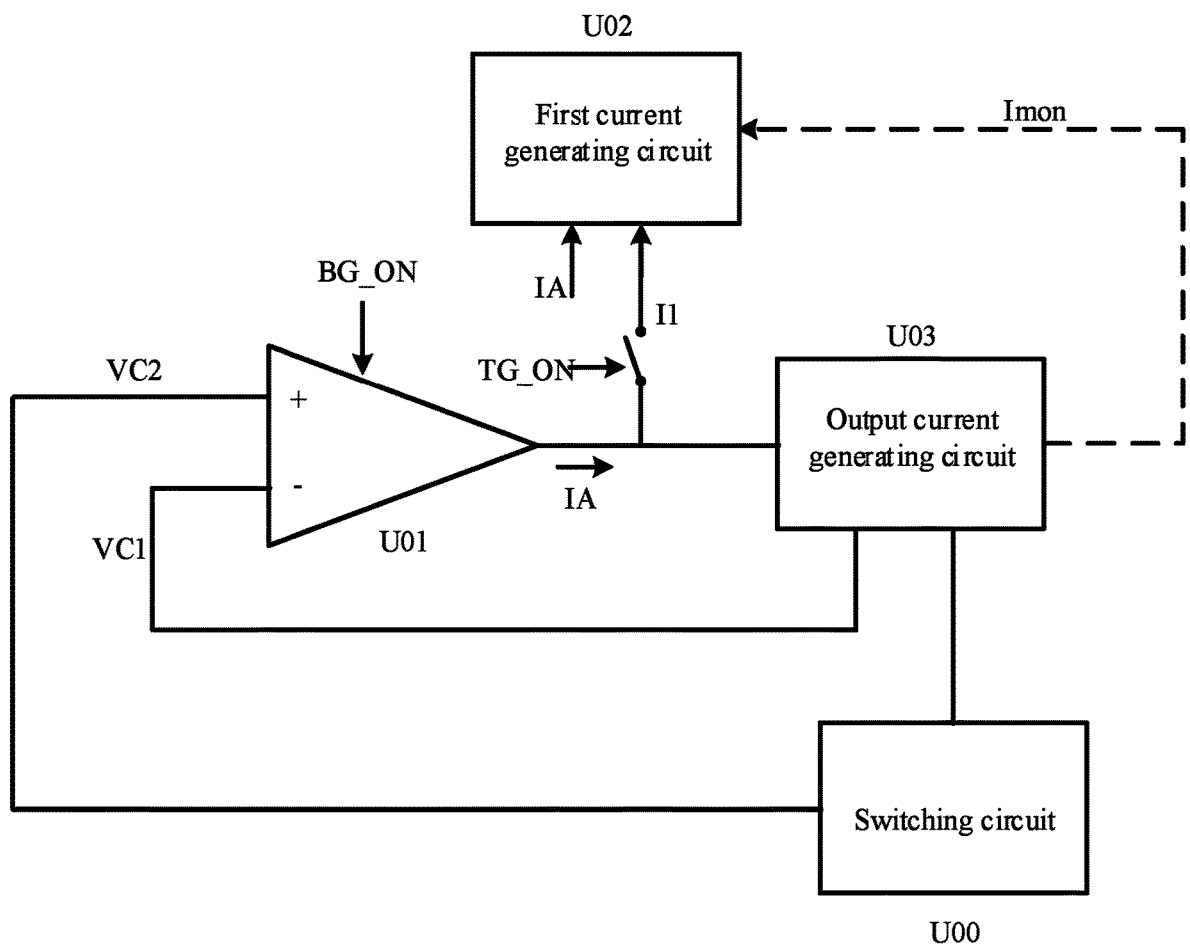
FIG. 1 is a control block diagram of an inductive current simulation circuit according to the present disclosure.

FIG. 1 is a control block diagram of an inductive current simulation circuit of a switching circuit according to the present disclosure. The switching circuit includes a main power transistor and a synchronous rectifier. The simulation circuit includes an operational amplifier U01, a first current generating circuit U02 and an output current generating circuit U03. In the conduction stage of the synchronous rectifier (BG_ON), the operational amplifier U01 is enabled, the operational amplifier U01 performs an error amplification on a first sampling signal VC1 representing a current of the synchronous rectifier and a second sampling signal VC2 representing an inductive current simulation signal, and the operational amplifier U01 outputs an error amplification signal. In the conduction stage of the synchronous rectifier, the error amplification signal drives the output current generating circuit U03. In a conduction stage of the main power transistor (TG_ON), the first current generating circuit U02 generates a first current I1 to drive the output current generating circuit U03. The output current generating circuit U03 outputs an inductive current simulation signal Imon. The first current generating circuit U02 generates the first current I1 according to the inductive current simulation signal Imon, a topological structure of the switching circuit, an input voltage and an output voltage. Alternatively, the first current I1 is generated according to a direction of an output current IA of the operational amplifier U01 within a first time when the synchronous rectifier is turned on.

Figure 2:
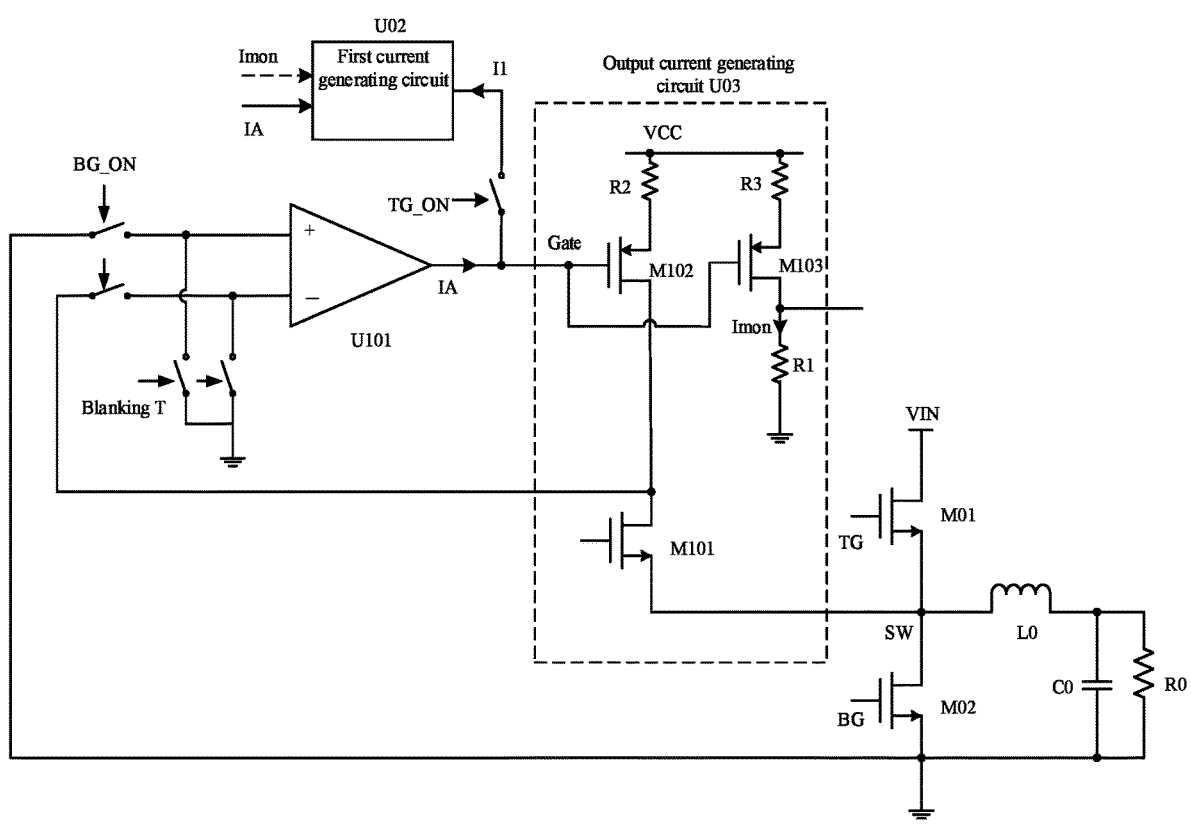
FIG. 2 is a principle diagram of the inductive current simulation circuit according to the present disclosure.

FIG. 2 is a principle diagram of an embodiment of the inductive current simulation circuit of the switching circuit according to the present disclosure. A buck circuit is taken as an example for the switching circuit. In the figure, the main power transistor is an M01 transistor, and the synchronous rectifier is an M02 transistor. The simulation circuit includes a sampling transistor M101, an output transistor M102, a mirror current transistor M103, an operational amplifier U101 and a first current generating circuit U02. A first terminal of the sampling transistor M101 is connected with a first terminal of the synchronous rectifier M02 in the buck circuit. A second terminal of the sampling transistor M101 is connected with the output transistor M102. In a conduction stage of the synchronous rectifier M02, a first input terminal of the operational amplifier U101 is connected with the second terminal of the sampling transistor M101, and a second input terminal of the operational amplifier U101 is connected with a second terminal of the synchronous rectifier M02. An output terminal of the operational amplifier U101 is connected with a control terminal of the output transistor M102. In the conduction stage of the synchronous rectifier M02, a voltage drop of the synchronous rectifier M02 represents a current of the synchronous rectifier M02, and a voltage drop of the sampling transistor M101 represents a current of the output transistor. Since the synchronous rectifier M02 and the sampling transistor M101 have a common connecting terminal, an error between the voltage drop of the synchronous rectifier M02 and the voltage drop of the sampling transistor M101 is corresponding to an error between a second terminal voltage of the synchronous rectifier M02 and a voltage at a common connecting terminal of the sampling transistor M101 and the output transistor M102, so that an output voltage of the operational amplifier U101 represents an error between the current of the synchronous rectifier M02 and the current of the output transistor M102. A control terminal of the mirror current transistor M103 is connected with the control terminal of the output transistor M102, and a current of the mirror current transistor M103 is a mirror current of the current of the output transistor M102. The first current generating circuit U02 generates a first current I1 according to the current Imon of the mirror current transistor M103, a topological structure of the switching circuit, an input voltage and an output voltage. Alternatively, the first current generating circuit generates a first current I1 according to a direction of an output current of the operational amplifier U101 within the first time when the synchronous rectifier is turned on. Since a parasitic capacitance exists at the control terminal of the output transistor M102, a driving voltage of the control terminal of the output transistor may be changed through the charging and discharging of the parasitic capacitance. Therefore, in the conduction stage of the main power transistor, the first current I1 is set to drive the output transistor M102. The current of the output transistor is the inductive current simulation signal, which represents the inductive current. In the present embodiment, one terminal of the output transistor M102 and one terminal of the mirror transistor M103 may be connected to a high potential terminal through resistors R2 and R3 respectively, so that the first current I1 has a better linear state.

Figure 3:
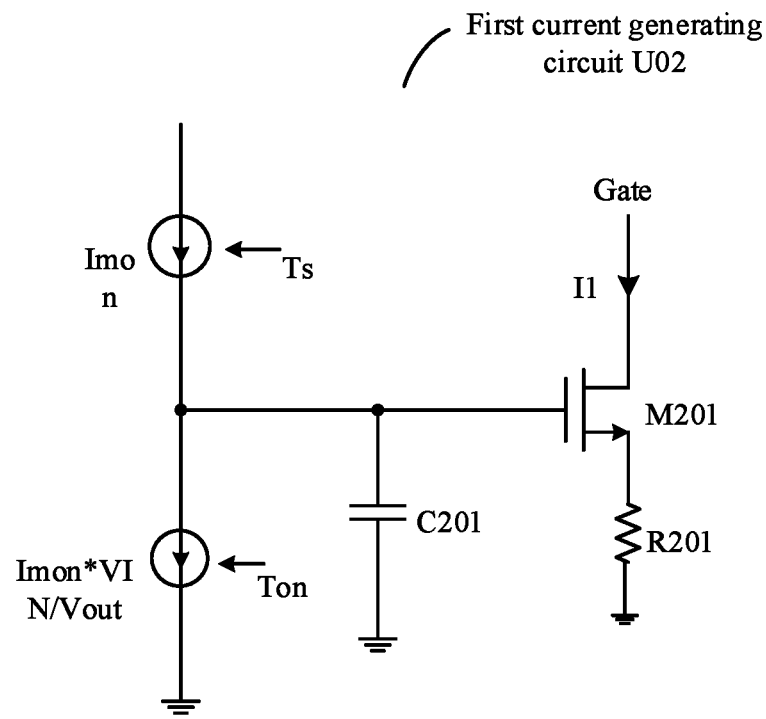
FIG. 3 is a principle diagram of a first embodiment of a first current generating circuit according to the present disclosure.

FIG. 3 shows a principle diagram of a first embodiment of a first current generating circuit according to the present disclosure. The first current generating circuit includes a first capacitor C201 and a switching transistor M201. A buck circuit is taken as an example. Throughout a switching cycle Ts, the first capacitor C201 is charged with the current Imon of the mirror current transistor M203 obtained in FIG. 1. During a conduction period of the main power transistor, the first capacitor C201 is discharged, and according to the volt-second balance principle of the inductive current, Imon*Ts=Imon*Ton/D=Imon*Ton*Vin/Vout, a discharging current of the first capacitor C201 is set as Imon*Vin/Vout. A voltage on the first capacitor C201 drives the switching transistor M201, and a current on the switching transistor M201 is the first current I1.

Figure 4:
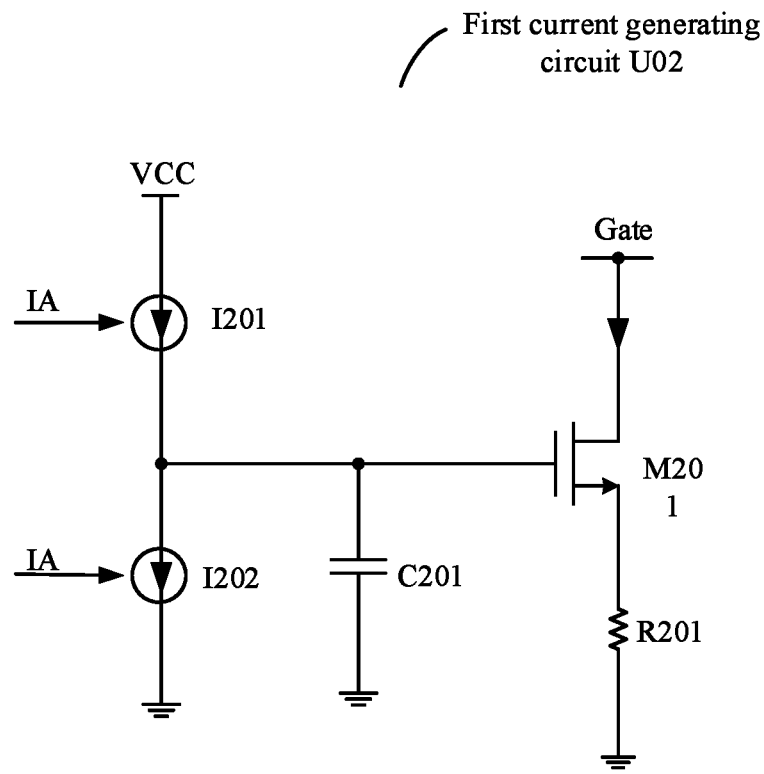
FIG. 4 is a principle diagram of a second embodiment of the first current generating circuit according to the present disclosure.

FIG. 4 shows a principle diagram of a second embodiment of the first current generating circuit according to the present disclosure. The first current generating circuit includes a first capacitor C201 and a switching transistor M201. Within a first time when the main power transistor is just turned on, when a direction of the output current of the operational amplifier U101 in FIG. 2 corresponds to an inflow direction of the current of the control terminal of the output transistor M102, it indicates that the peak current of the main power transistor M01 is relatively high and the first capacitor C201 is discharged. When a direction of the output current of the operational amplifier U101 in FIG. 2 corresponds to an outflow direction of the current of the control terminal of the output transistor M102, and when the control terminal Gate of the output transistor M102 pulls down current, it indicates that the peak current of the main power transistor M01 is relatively low, and the first capacitor C201 is charged. The charging current I201 and the discharging current I202 of the first capacitor C201 have a same magnitude and each is a set current. A voltage of the first capacitor C201 drives the switching transistor M201, and a current of the switching transistor M201 refers to the first current I1.

Although the embodiments are separately illustrated and described above, the embodiments contain some common technologies. Those skilled in the art can replace and integrate the embodiments. Any content not clearly recorded in one of the embodiments may be determined based on another embodiment where the content is recorded.

The embodiments described above do not constitute a limitation on the scope of protection of the technical solution of the present disclosure. Any modification, equivalent replacement, and improvement made within the spirit and principle of the above-mentioned embodiments shall fall within the scope of protection of the technical solution of the present disclosure.

What is claimed is:

1. An inductive current simulation circuit of a switching circuit, wherein the switching circuit comprises a main power transistor and a synchronous rectifier, and the inductive current simulation circuit comprises:
   an error amplification circuit, configured to receive a first sampling signal representing a current of the synchronous rectifier and a second sampling signal representing an inductive current simulation signal in a conduction stage of the synchronous rectifier, and output an error amplification signal;
   an output current generating circuit, configured to generate the inductive current simulation signal, wherein in the conduction stage of the synchronous rectifier, the error amplification signal drives the output current generating circuit, and in a conduction stage of the main power transistor, the output current generating circuit is driven by a first current; and
   a first current generating circuit, configured to generate the first current according to the inductive current simulation signal, a topological structure of the switching circuit, an input voltage and an output voltage, wherein the first current generating circuit comprises a first capacitor and a first switching transistor, a charging current of the first capacitor is set according to the inductive current simulation signal, and a discharging current of the first capacitor is set according to the charging current, the topological structure of the switching circuit, the input voltage and the output voltage; the first capacitor is charged with the charging current throughout a work cycle, and the first capacitor is discharged with the discharging current during a conduction period of the main power transistor; and a voltage of the first capacitor drives the first switching transistor, and a current of the first switching transistor is the first current.

2. The inductive current simulation circuit according to claim 1, wherein the output current generating circuit comprises an output transistor and a sampling transistor, a first terminal of the output transistor is connected with a first terminal of the sampling transistor, and a second terminal of the sampling transistor is connected with a common connecting terminal of the main power transistor and the synchronous rectifier; in the conduction stage of the synchronous rectifier, the error amplification signal drives the output transistor; and in the conduction stage of the main power transistor, the first current drives the output transistor, and a current of the output transistor represents the inductive current simulation signal.

3. The inductive current simulation circuit according to claim 2, wherein a second terminal of the output transistor is connected with a resistor.

4. The inductive current simulation circuit according to claim 2, wherein a first input terminal of the error amplification circuit is connected with a grounding terminal of the synchronous rectifier, and a second terminal of the error amplification circuit is connected with a common connecting terminal of the sampling transistor and the output transistor; and in the conduction stage of the synchronous rectifier, the error amplification circuit is enabled to output the error amplification signal.

5. The inductive current simulation circuit according to claim 1, wherein the switching circuit is a buck circuit, the charging current of the first capacitor represents the inductive current simulation signal, and the discharging current of the first capacitor is proportional to a product of the charging current and the input voltage and inversely proportional to the output voltage.

6. An inductive current simulation method of a switching circuit, wherein the switching circuit comprises a main power transistor and a synchronous rectifier, and the inductive current simulation method comprises the following steps:
based on an error amplification circuit, performing an error amplification on a first sampling signal representing a current of the synchronous rectifier and a second sampling signal representing an inductive current simulation signal when the synchronous rectifier is turned on to obtain an error amplification signal; and
reconstructing an inductive current according to the error amplification signal when the synchronous rectifier is turned on and a first current when the main power transistor is turned on to obtain the inductive current simulation signal, wherein the first current is generated according to the inductive current simulation signal, a topological structure of the switching circuit, an input voltage and an output voltage, and wherein a charging current of a first capacitor is set according to the inductive current simulation signal, and a discharging current of the first capacitor is set according to the charging current, the topological structure of the switching circuit, the input voltage and the output voltage; the first capacitor is charged with the discharging current throughout a work cycle, and the first capacitor is discharged with the discharging current during a conduction period of the main power transistor; and a voltage of the first capacitor drives a first switching transistor, and a current of the first switching transistor is the first current.

7. The inductive current simulation method according to claim 6, wherein the switching circuit is a buck circuit, the charging current of the first capacitor represents the inductive current simulation signal, and the discharging current of the first capacitor is proportional to a product of the charging current and the input voltage and inversely proportional to the output voltage.

8. A switched-mode power supply, comprising an inductive current simulation circuit to simulate an inductive current of a switching circuit, wherein the switching circuit comprises a main power transistor and a synchronous rectifier, and the inductive current simulation circuit comprises:
an error amplification circuit, configured to receive a first sampling signal representing a current of the synchronous rectifier and a second sampling signal representing an inductive current simulation signal in a conduction stage of the synchronous rectifier, and output an error amplification signal; and
an output current generating circuit, configured to generate the inductive current simulation signal, wherein in the conduction stage of the synchronous rectifier, the error amplification signal drives the output current generating circuit, and in a conduction stage of the main power transistor, the output current generating circuit is driven by a first current, wherein the inductive current simulation circuit further comprises a first current generating circuit, configured to generate the first current according to the inductive current simulation signal, a topological structure of the switching, circuit, an input voltage and an output voltage, and wherein the first current generating circuit comprises a first capacitor and a first switching transistor, a charging current of the first capacitor is set according to the inductive current simulation signal, and a discharging current of the first capacitor is set according to the charging current, the topological structure of the switching circuit, the input voltage and the output voltage; the first capacitor is charged with the charging current throughout a work cycle, and the first capacitor is discharged with the discharging current during a conduction period of the main power transistor; and a voltage of the first capacitor drives the first switching transistor, and a current of the first switching transistor is the first current.

\* \* \* \* \*